3 Sheets—Sheet 1.
R. P. REILLY & W. P. SPELLER.
Electro-Magnetic Turnstile Register.
No. 211,257.  Patented Jan. 7, 1879.
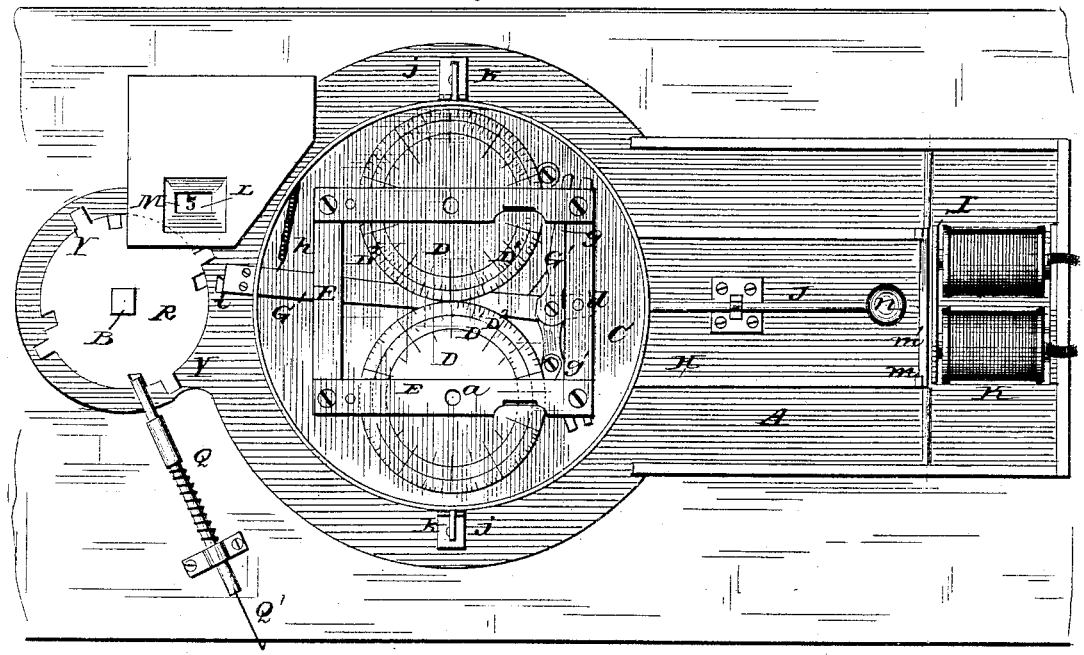

3 Sheets—Sheet 2.
R. P. REILLY & W. P. SPELLER.
Electro-Magnetic Turnstile Register.
No. 211,257.  Patented Jan. 7, 1879.
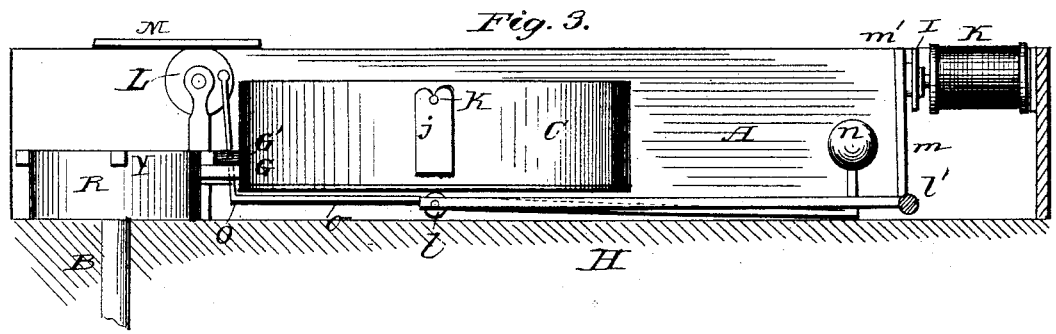
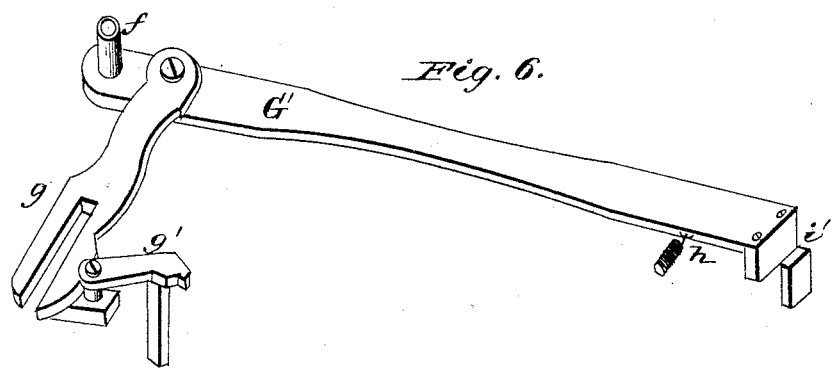
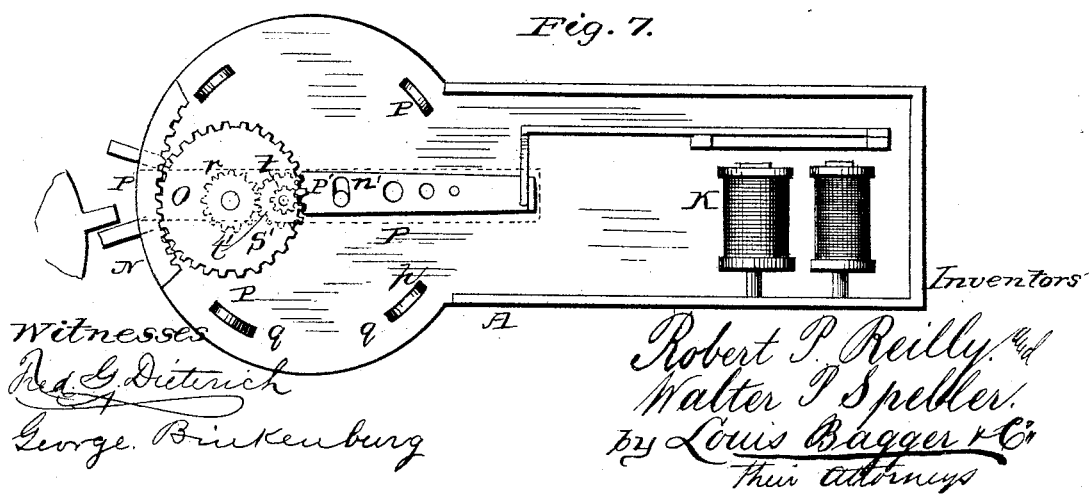

R. P. REILLY & W. P. SPELLER.
Electro-Magnetic Turnstile Register.
No. 211,257. Patented Jan. 7, 1879.

UNITED STATES PATENT OFFICE.

ROBERT P. REILLY AND WALTER P. SPELLER, OF NEW YORK, N. Y.

IMPROVEMENT IN ELECTRO-MAGNETIC TURNSTILE-REGISTERS.

Specification forming part of Letters Patent No. 211,257, dated January 7, 1879; application filed October 28, 1878.

*To all whom it may concern:*

Be it known that we, ROBERT P. REILLY and WALTER P. SPELLER, of New York, in the county of New York and State of New York, have invented certain new and useful Improvements in Electro-Magnetic Turnstile Fare-Registers; and we do hereby declare that the following is a full, clear, and exact description of the invention, which will enable others skilled in the art to which it appertains to make and use the same, reference being had to the accompanying drawings, which form a part of this specification, and in which—

Figure 4:
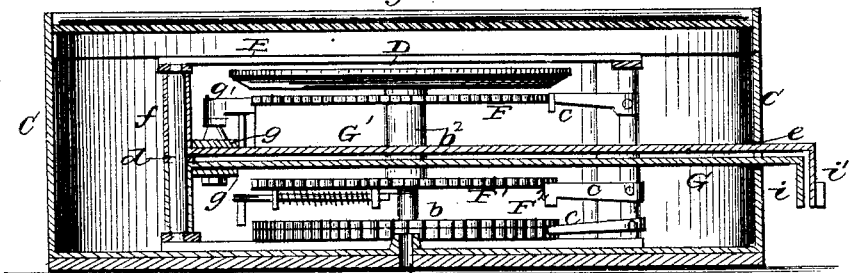
Figure 5:
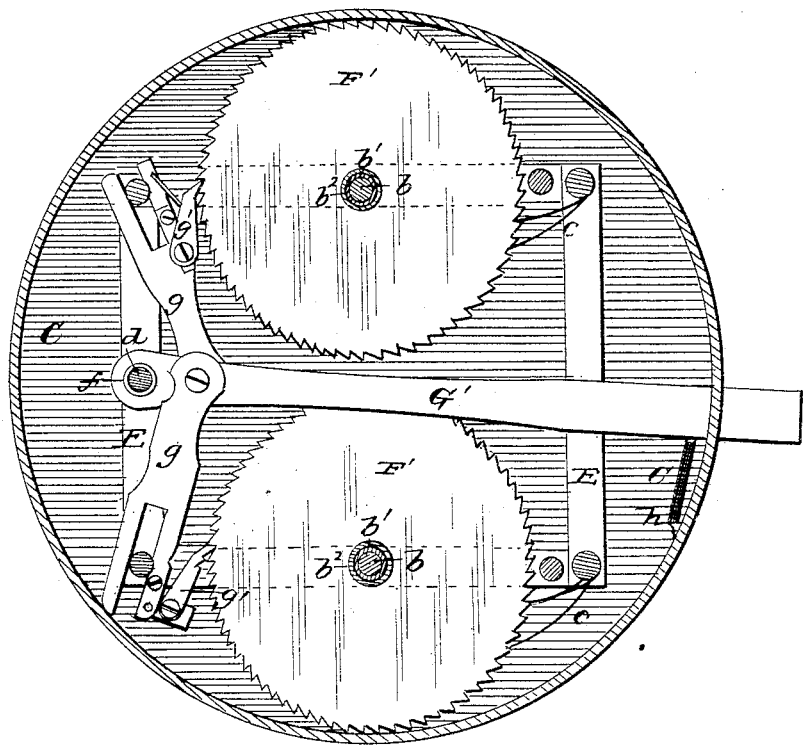

Figure 1 is a plan view of our improved turnstile fare-register with its internal mechanism exposed. Fig. 2 is a similar view thereof with the register proper removed. Fig. 3 is a side view with one side of the containing-case removed. Figs. 4 and 5 are, respectively, a vertical and a horizontal section of the same. Fig. 6 is a detailed perspective view of one of the dial-ring or pointer-actuating levers; and Fig. 7 is a sectional view, representing a modified form of our invention.

Corresponding parts in the several figures are denoted by like letters.

This invention appertains to certain improvements in that class of turnstile fare-registers employing double registering mechanism, either of which is susceptible of being controlled separately by an electro-magnet, to enable their separate operation, and having means, also under the control of the magnet, for indicating the amount of the fare *per capita*, and for adjusting or changing the fare; and it consists, essentially, in so supporting the registers in position as to permit of their being adjusted horizontally or vertically, by which said adjustment either one of the dial or pointer actuating levers will be separately brought into contact with cams affixed upon and operated by the turnstile for using either one of the registers, as occasion may require, which tilting of the register is performed by an electro-magnet, substantially as hereinafter more fully set forth.

In the drawing, A marks a case adapted to inclose the electro-magnet and support the register, and B refers to the turnstile head or cam, arranged to operate in connection with the register. C refers to a circular or other suitably-shaped case containing the registers. These registers, each of which consists of three or more concentric dials or rings, D D¹ D², graduated to register, respectively, for each complete revolution of one a hundred on the adjoining one, and for a similar revolution of the one indicating the hundreds a thousand on the third one, are arranged upon shafts $a$, hung in a frame, E, fastened in the case C. Arranged in connection with each of these rings or dials is a ratchet, F F¹ F², connected therewith, one by an intermediate flange or rim, $b$, and the others, respectively, by tubular shafts $b^1 b^2$, disposed concentrically upon the shafts $a$, which parts are so constructed as to cause each ratchet or dial to affect the other at certain intervals—*i. e.*, when one has performed a complete revolution, it, in turn, will move the next one a certain distance, and upon the performance of a complete revolution of the second one the third one will be moved likewise a certain distance, say, one-twentieth of its circumference, the units on the faces of the lesser dial being five to each space. To prevent the reverse or return movement of the ratchets, pawls $c$ $c$ engage therewith, which pawls are fastened to cross-bars of the frame E.

G G' are the dial or pointer actuating levers, pivoted one directly to or upon a stationary axis or fulcrum, $d$, fastened in the frame E, and reaching out through a slot, $e$, in the case C, to allow it to have a limited movement. The other lever, G', is fitted upon the axis $d$ by means of a sleeve, $f$, to permit of its having an independent movement, and being operated without affecting the lever G or the latter affecting it when operated. To the inner ends of these levers are connected or pivoted slotted arms $g$ $g$, whose slots receive cross-bars in the frame E, to hold and guide them in position.

The free ends of the arms $g$ $g$ of the levers G G' are provided with spring pawls or dogs $g'$ $g'$, which, as the said levers are struck and moved forward by the turnstile head or cam B, engage and rotate the ratchets of the unit dial or dials through a certain interval of space—viz., that equal to one of the spaces into which its face is divided. The operating-lever, G or G', as the case may be, is returned to its normal position by a spring, $h$, as shown in Fig. 5 of the drawings. These levers may rest one directly above the other, as shown in the present instance, and their projecting ends extend one beyond the other, as at $i$ $i'$, to permit of their being separately operated or struck by the turnstile-cam, or they may be separated horizontally from each other to permit of their separate contact with the turnstile cam or cams to use either register independent of the other.

The register-case C is hung or trunnioned in slotted uprights or supports $j$, fastened to the plate or case A, and receives a central holding-pin, $k$, from the said support. Beneath the register-case C is arranged the forward end of a frame, H, whose side pieces may be provided with rollers $l$, forming bearings for said case.

The outer or rear end of the frame H is hung by a rock-shaft, $l'$, in the sides of the case or support A, and extended upwardly, as at $m$, its two side pieces being connected together by a cross-bar, $m'$, thus forming said frame into a lever, by which the register-case may be tilted or elevated, while it will, by its own gravity, return to its original or balanced position for separately engaging the levers of the two registers with the turnstile-cam, as will be more fully explained presently.

To balance the register-case in position, or rather lift its bearings, formed by the forward end of the frame or lever H, in an elevated position, to render the rear or upper end of said lever, which is provided with the armature I, more easily attracted by the magnet, a lever, J, is pivoted to the support or case A, with one end extending beneath the case C, and its upwardly-bent portion weighted or loaded, as shown at $n$.

K is the electro-magnet, which is bolted to the case or support A, and connected in the usual way with a battery or batteries, with which connection is made from, say, the office of the superintendent of the company employing the register or registers. Still further connection is made with a gong or other sounding-instrument placed in the office of the one who receives the fares at the turnstile.

A roller, L, hung in an elevated position alongside the register, and suitably inclosed with a viewing-aperture, preferably covered with glass, as shown at M, is painted or impressed with figures, that will indicate the amount of fare per capita to be taken by the fare-collector from passengers, &c. This roller or fare-indicator is connected eccentrically by jointed levers $o$ $o'$ to the frame or lever H.

When it is desired to disengage the lever of one of the registers from the turnstile, as is necessary at stated periods, to obtain the amount of fares registered as taken in through the day or night, the superintendent or other person whose duty it is to supervise the conductor's or fare-collector's accounts applies the electro-magnet, by closing the circuit with the aid of a suitably-arranged key in his office, to the armature of the frame or lever H, supporting the register-case, when it will be seen that the said case will be elevated or tilted so as to elevate the lever of one of the registers—viz., the one that has been in use out of a line with the turnstile-operating cam—and simultaneously bring the lever of the other register in line therewith, and thus allow the face of the register that has been in use to be read and footed up for transference to the books of the company. As during this interval the recording of the fares will be continued by the bringing into operation of the other register, there will be no interruption of the registration of the fares.

Simultaneous also with this adjustment of parts the changing of the fare can be effected through the indicator or roller L, it being under the control of the superintendent. This fact is brought to the knowledge or attention of the conductor or fare-collector by the superintendent signaling or sounding through the battery-wires a gong or other suitable instrument placed within the hearing or sight of the former person.

The operating-cams of the turnstile or the projecting ends of the levers of the registers may either be provided with rollers to enable the easy passage of one past the other, and to lessen friction. The register-case is provided, for convenience, with a glass or transparent face, through which to view the faces of the dials or registers.

To use the registers when the dial or pointer actuating levers are arranged in the same horizontal plane, (the mechanism above described for operating them only being adapted to operate them when arranged one above the other,) the below-described modification in the arrangement of operating parts is adopted.

The register-case, instead of being hung tiltingly in a horizontal position, is secured or mounted upon frictional rollers $p$, (see Fig. 7,) hung in a circular or other shaped rim or flange, $q$, of the supporting-case A. To the lower side of the register-case is affixed a toothed segment, N, with which meshes a large toothed wheel, O, fastened to a very small pinion, $r$, said wheel O and its pinion $r$ being connected by an axis to a plate or support, P, fastened to the same side of said register-case.

P' is a lever fulcrumed near the most distant end of the plate P, with the end of its shortest arm touching the electro-magnet, and its other end provided with a toothed segment, $s$, engaging a pinion, $t$, connected to a little larger pinion, $t'$, on the same axis, and gearing with the pinion $r$ of the wheel O. An elongated slot, $u'$, in the lever P', up through which the register-case shaft passes from the plate P, limits the movement of said lever.

It will be readily seen that by applying the magnet to the lever P' so as to attract it laterally a certain amount of movement will be imparted to the register-case, so as to bring either one of the pointer or dial actuating levers, according to the direction in which the lever may be moved—to the right or left—in position to be operated by one of the notched cams or heads of the turnstile.

Q is a spring-bolt adjusted to the under side of the table or support A, and engaging with a notched cam or plate, R, secured upon the upper end of the turnstile-shaft, and having arms $v$ to engage and strike the pointer or dial actuating levers. This bolt is to prevent the turning of the stile when not in use. It is retracted from its receiving-notch by the wire or its equivalent Q', confined in position and operated in any suitable manner.

It is obvious that, instead of employing a head or cam provided with arms and affixed centrally upon the turnstile for operating the register-levers, these and the registers may be so placed in relation to the turnstile as to be operated by being struck by the arms or wings of this as they rotate.

Having thus described our invention, we claim and desire to secure by Letters Patent of the United States—

1. In combination, the electro-magnet K, hinged frame H $m$ $m'$, having the armature I, weighted lever J, and adjustably-pivoted register-case C, substantially as and for the purpose herein shown and specified.

2. In combination with the register ratchet-disks $F^1$ $F^1$, the operating double levers G G', provided each with a hinged arm, $g$, carrying a pivoted spring-pawl, $g'$, the said levers being pivoted upon a common center, and so arranged that either one may be operated independently of the other, substantially as and for the purpose herein shown and specified.

3. The combination of the operating turnstile head or cam B, having arms Y, or their equivalent, independently-operating levers G G', pivoted upon a common center within the register-case C, and register-ratchets $F^1$ $F^1$, substantially as and for the purpose herein shown and specified.

4. The combination of the indicator or roller L, arms O O', pivoted frame H, provided with the armature I, and operating electro-magnet K, substantially as and for the purpose herein shown and specified.

In testimony that we claim the foregoing as our own we have hereunto affixed our signatures in presence of two witnesses.

ROBERT P. REILLY.
    WALTER P. SPELLER.

Witnesses:
 ERNEST DREHER,
 ANTON IFFRIG.